(12) United States Patent
Bogachuk et al.

(10) Patent No.: US 12,472,806 B2
(45) Date of Patent: Nov. 18, 2025

(54) MOUNTING STRUCTURE FOR ELECTRIC VEHICLE

(71) Applicant: Ford Global Technologies, LLC, Dearborn, MI (US)

(72) Inventors: Vladimir Vladimirovich Bogachuk, West Bloomfield, MI (US); Kevin A. Gustafson, S. Rockwood, MI (US); Robert Reiners, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 518 days.

(21) Appl. No.: 17/962,033

(22) Filed: Oct. 7, 2022

(65) Prior Publication Data

US 2024/0116347 A1 Apr. 11, 2024

(51) Int. Cl.
*B60K 1/04* (2019.01)

(52) U.S. Cl.
CPC ........ *B60K 1/04* (2013.01); *B60K 2001/0438* (2013.01)

(58) Field of Classification Search
CPC ................. B60K 2001/0438; B62D 21/15
See application file for complete search history.

(56) References Cited

U.S. PATENT DOCUMENTS

| | | | |
|---|---|---|---|
| 6,010,155 A | 1/2000 | Rinehart | |
| 8,716,624 B2 | 5/2014 | Johnson et al. | |
| 8,872,060 B2 | 10/2014 | Johnson et al. | |
| 9,669,786 B2 | 6/2017 | Johnson et al. | |
| 9,926,017 B1* | 3/2018 | Hamilton | B62D 25/20 |
| 10,150,435 B2* | 12/2018 | Kawase | B60L 50/64 |
| 10,632,857 B2* | 4/2020 | Matecki | B60L 50/64 |
| 10,661,646 B2* | 5/2020 | Matecki | B60L 50/66 |
| 10,689,037 B2* | 6/2020 | Uehata | B62D 25/2036 |
| 10,720,620 B1* | 7/2020 | Grace | H01M 50/244 |
| 10,773,582 B2* | 9/2020 | Steiner | B62D 25/025 |
| 10,850,774 B2* | 12/2020 | Amrit | B60K 1/04 |
| 11,207,963 B2* | 12/2021 | Qin | B62D 25/20 |
| 11,472,278 B2* | 10/2022 | Marshall | H01M 50/20 |
| 11,485,214 B2* | 11/2022 | Baccouche | B62D 21/02 |
| 11,518,227 B2* | 12/2022 | Schmidt | B62D 25/20 |
| 11,560,180 B2* | 1/2023 | Matecki | B62D 21/157 |
| 11,608,120 B2* | 3/2023 | Klamser | B62D 21/157 |
| 11,958,533 B2* | 4/2024 | Kuipers | B62D 21/157 |
| 11,987,112 B2* | 5/2024 | Maguire | H01M 50/262 |
| 12,024,227 B2* | 7/2024 | Fujikawa | B62D 21/15 |
| 2019/0255930 A1* | 8/2019 | Steiner | B60K 6/28 |
| 2021/0300476 A1* | 9/2021 | Gonzalez Mendivil | B62D 21/02 |
| 2023/0264752 A1* | 8/2023 | Kamemoto | B60K 1/04 296/203.01 |
| 2024/0262424 A1* | 8/2024 | Feuerstein | B62D 29/008 |
| 2024/0416736 A1* | 12/2024 | Shirai | H01M 50/242 |

* cited by examiner

Primary Examiner — Jeffrey J Restifo
(74) Attorney, Agent, or Firm — Burris Law, PLLC

(57) ABSTRACT

A single monolithic body extends in a longitudinal direction and includes multiple closed sections stacked vertically. A first end portion of the single monolithic body extends from one of the closed sections into an adjacent closed section, and a second end portion of the single monolithic body extends from one of the closed sections, along an exterior of an adjacent closed section, and laterally away from the single monolithic body to form a connecting flange.

20 Claims, 8 Drawing Sheets

MOUNTING STRUCTURE FOR ELECTRIC VEHICLE

FIELD

The present disclosure relates to a mounting structure for an electric vehicle, and an electric vehicle including a mounting structure.

BACKGROUND

The statements in this section merely provide background information related to the present disclosure and may not constitute prior art.

Electric vehicles differ from conventional motor vehicles because they are driven by one or more rechargeable battery packs having lithium-ion batteries, for example, or any other suitable electrical power storage units. The battery pack typically powers one or more motors to drive a set of wheels. The size and weight of the battery pack is typically greater for electric vehicles capable of traveling long distances (e.g., electric vehicles capable of traveling more than 500 miles). Depending on the mounting location relative to the electric vehicle, the battery pack may be susceptible to various vehicle loads.

Integration of rechargeable battery packs into the structure of existing vehicles and providing efficient load paths in a variety of operating conditions can be challenging, primarily due to the increased weight of the battery packs and their larger footprint in the vehicle. The present disclosure addresses these and other issues related to the integration of rechargeable battery packs in electric vehicles.

SUMMARY

This section provides a general summary of the disclosure and is not a comprehensive disclosure of its full scope or all of its features.

In one form, the present disclosure provides a mounting structure for a battery housing. The mounting structure includes a single monolithic body extending in a longitudinal direction. The single monolithic body includes multiple adjacent closed sections stacked relative to each other. A first end portion of the single monolithic body extends from one of the closed sections into an adjacent closed section, and a second end portion of the single monolithic body extends from one of the closed sections, along an exterior of an adjacent closed section, and laterally away from the single monolithic body to form a connecting flange.

In variations of the mounting structure of the above paragraph, which may be implemented individually or in any combination: the single, monolithic body has a variable thickness; the connecting flange has a thickness that is greater than a thickness of each wall forming the multiple closed sections; the first end portion extends into the adjacent closed section and is welded to a vertical wall of the adjacent closed section; the single, monolithic body comprises an upper wall and a lower wall, the connecting flange is positioned between the upper wall and the lower wall; the single, monolithic body includes a central internal brace disposed between the upper wall and the lower wall and substantially parallel to the upper wall and the lower wall; the connecting flange is located above the central internal brace; an upper closed section of the multiple closed sections includes a plurality of first walls defining a first cavity and a lower closed section of the multiple closed sections includes a plurality of second walls defining a second cavity; the connecting flange is welded to a vertical wall of the plurality of first wall; the connecting flange extends an entire length of the mounting structure; and each section of the multiple closed sections has a rectangular shaped cross-section.

In another form, the present disclosure provides a structural assembly for an electric vehicle. The structural assembly includes a battery housing and a pair of mounting structures. The battery housing is configured to house power storage units. Each mounting structure of the pair of mounting structures is secured to a respective side of the battery housing and is configured to mount the battery housing to a respective rail of a pair of opposed rails. Each mounting structures includes a single monolithic body extending in a longitudinal direction. The single monolithic body includes multiple adjacent closed sections stacked relative to each other. A first end portion of the single monolithic body extends from one of the closed sections into an adjacent closed section, and a second end portion of the single monolithic body extends from one of the closed sections, along an exterior of an adjacent closed section, and laterally away from the single monolithic body to form a connecting flange.

In variations of the structural assembly of the above paragraph, which may be implemented individually or in any combination: the single, monolithic body has a variable thickness; the connecting flange has a thickness that is greater than a thickness of each wall forming the multiple closed sections; fasteners extend through the connecting flange and configured to extend at least partially through the respective rail; the single, monolithic body includes an upper wall and a lower wall, the connecting flange is positioned between the upper wall and the lower wall; and the single, monolithic body includes a central internal brace disposed between the upper wall and the lower wall and substantially parallel to a level ground surface when the electric vehicle is on the level ground surface.

In yet another form, the present disclosure provides a mounting structure. The mounting structure is formed by a roll forming process and includes a single monolithic body extending in a longitudinal direction. The single monolithic body includes multiple closed sections stacked vertically. A first end portion of the single monolithic body extends from one of the closed sections into an adjacent closed section, and a second end portion of the single monolithic body extends from one of the closed sections, along an exterior of an adjacent closed section, and laterally away from the single monolithic body to form a connecting flange.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
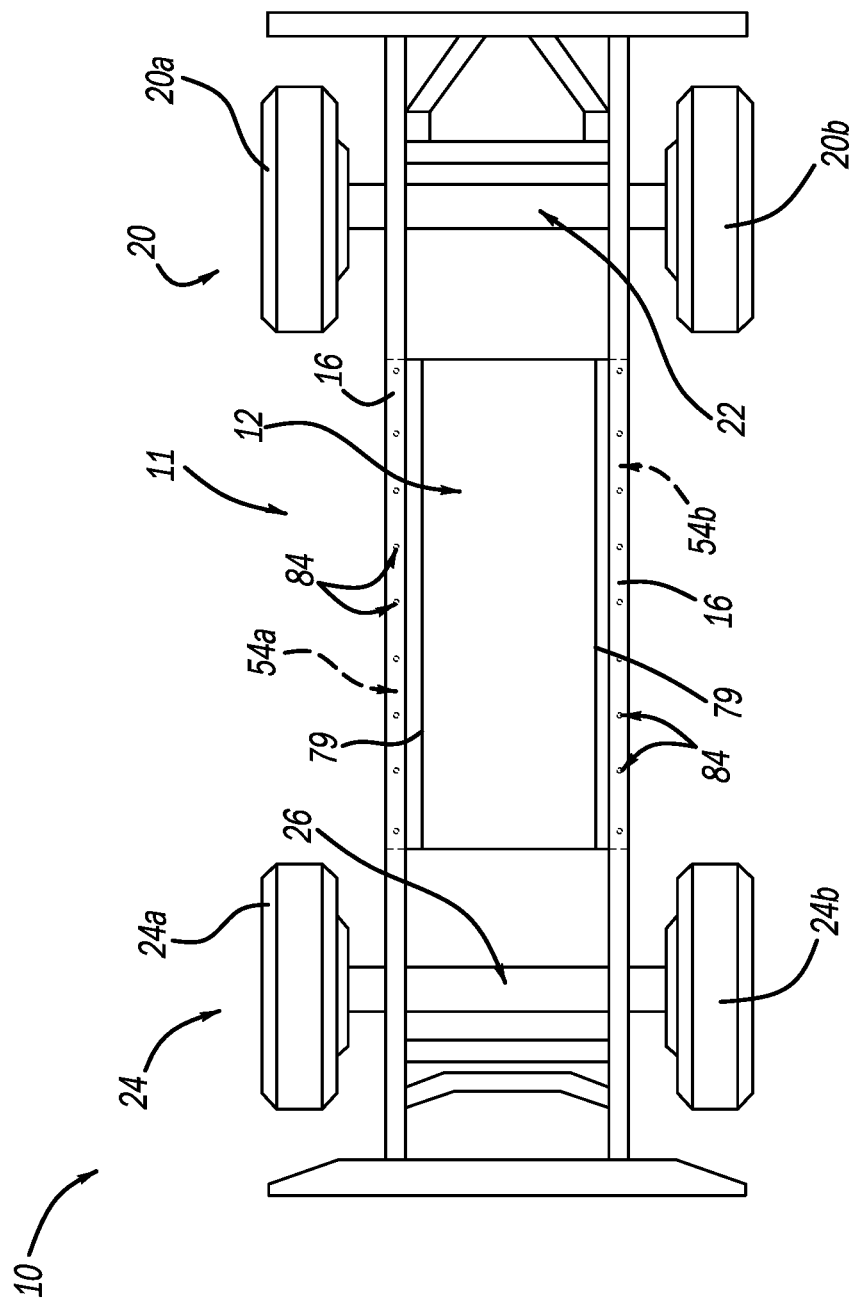
FIG. 1 is a schematic view of a vehicle including a battery pack and a battery pack mounting structure according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
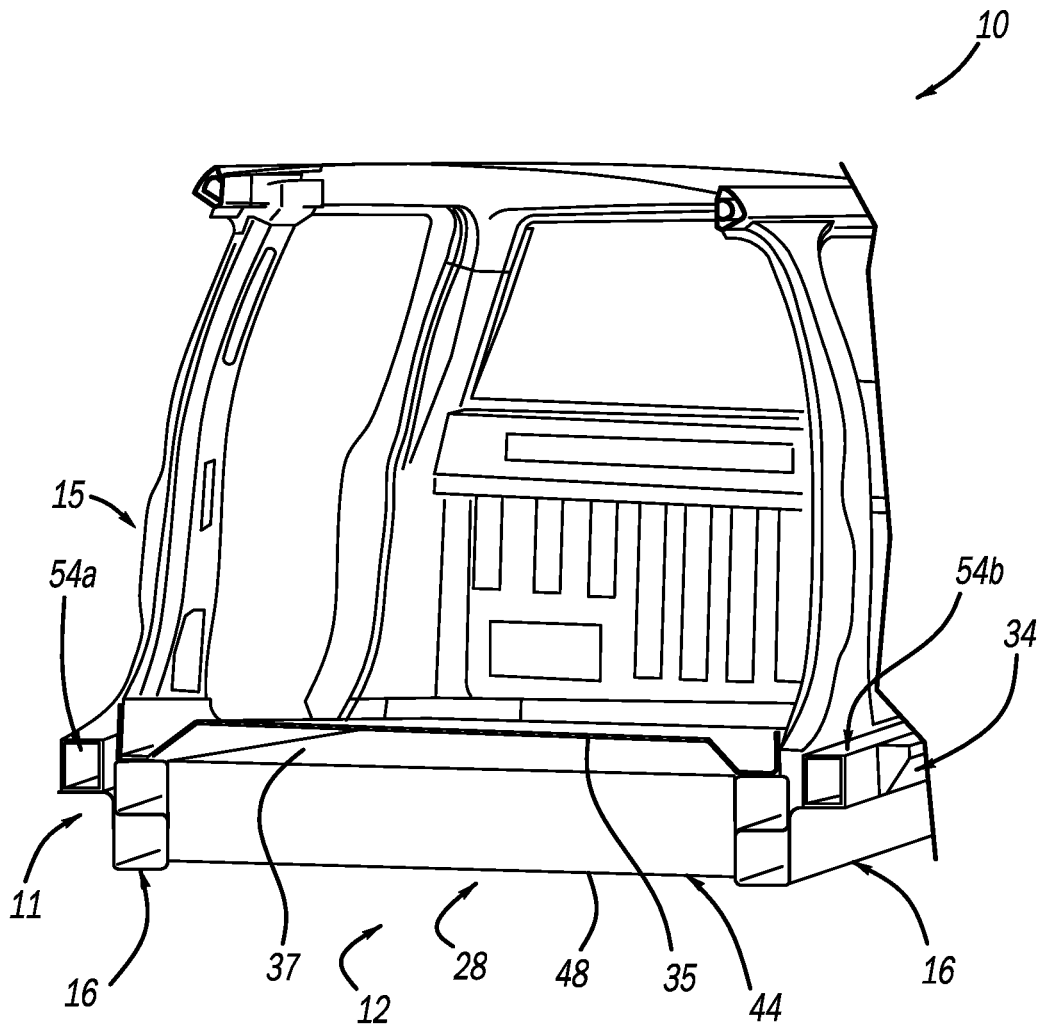
FIG. 2 is a cross-sectional perspective view of the battery pack and a vehicle body of the vehicle of FIG. 1.

With reference to FIGS. 1 and 2, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. The vehicle 10 includes a vehicle frame 11, a battery housing assembly 12 (also referred to herein as a battery pack), and a pair of battery mounting structures 16 (also referred to herein as a battery pack mounting structure). The vehicle frame 11 is the main supporting structure of the vehicle 10, to which various components are attached either directly or indirectly. The vehicle frame 11 includes opposed longitudinal rails 54a, 54b. The rails 54a, 54b are spaced apart from each other and may establish a length of the vehicle frame 11.

A vehicle body 15 is separate (distinct) from and mounted on the vehicle frame 11. Stated differently, the vehicle body 15 is mounted on a plurality of mounts 34 secured to the vehicle frame 11. The vehicle body 15 includes cross members 35 extending above the battery housing assembly 12.

Figure 3:
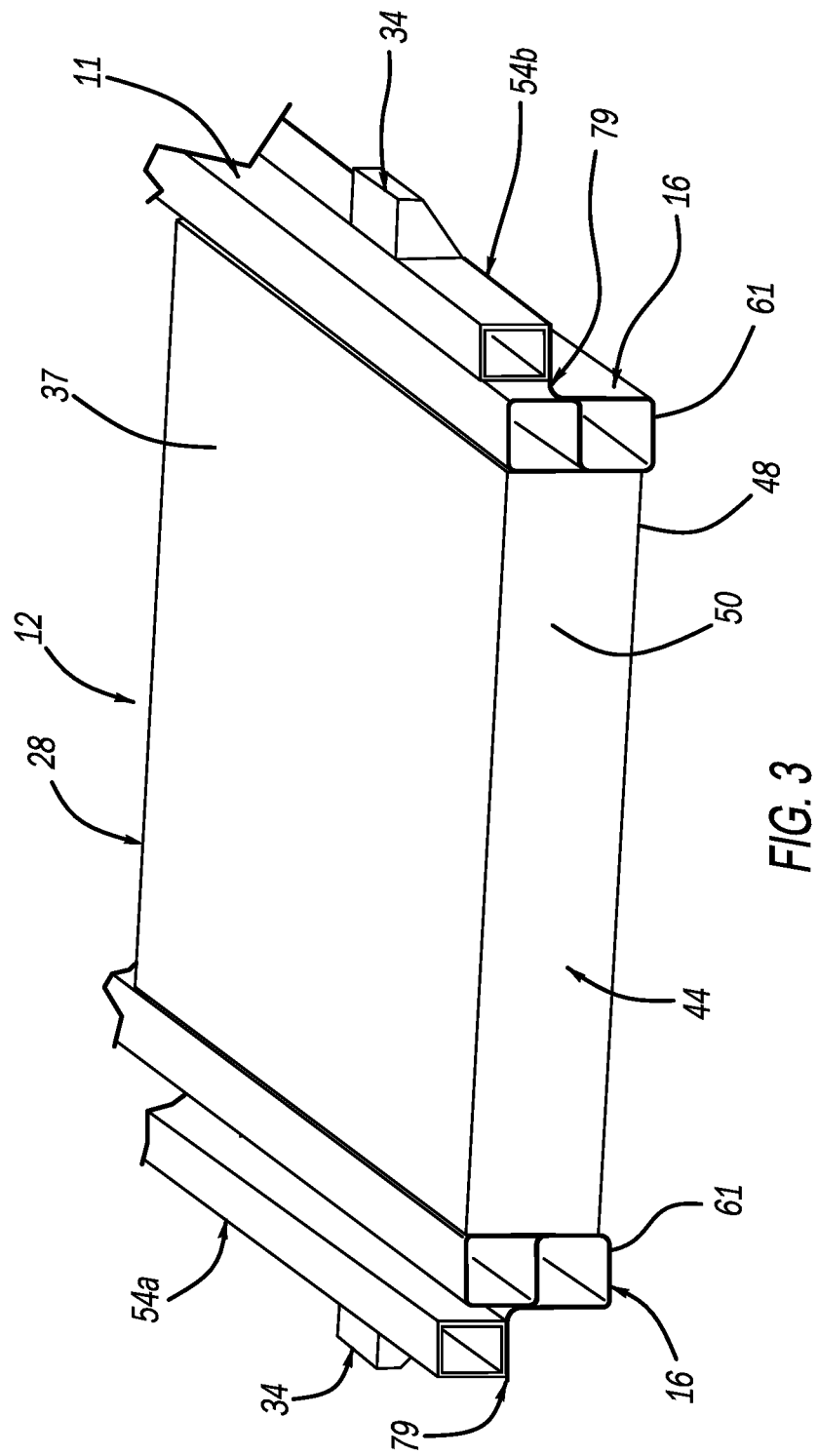
FIG. 3 is a perspective view of the battery pack mounting structure and the battery pack of FIG. 1.

With reference to FIG. 2, the battery housing assembly 12 is located below the vehicle body 15 and powers one or more motors to drive a set of drive wheels. For example, with reference to FIG. 1, the battery housing assembly 12 may power a rear motor (not shown) to drive rear wheels 20a, 20b of a set of rear wheels 20 via a rear axle 22 and/or may power a front motor (not shown) to drive front wheels 24a, 24b of a set of front wheels 24 via a front axle 26. The battery housing assembly 12 includes one or more battery arrays (not shown) and a battery tray or housing 28 (FIGS. 2 and 3). The battery housing 28 is an enclosure which provides a structural surrounding and sealed compartment for the battery arrays and other battery components such as cooling lines, support brackets, and wiring disposed therein. The battery arrays may be rechargeable and may include lithium-ion batteries or any other suitable electrical power storage units. In some forms, the battery arrays are stacked on top of each other.

With reference to FIGS. 2 and 3, the battery housing 28 may be disposed at various locations of the vehicle 10 and is mounted to the vehicle frame 11. In this way, the battery housing 28 is supported by the vehicle frame 11 and is remote from a passenger cabin (not shown) and cargo compartments (not shown) of the vehicle 10, therefore, not occupying space that would otherwise be available for passengers or cargo. The battery housing 28 includes a lid 37, a body 44, and internal cross members (not shown). The lid 37 is removably coupled to the body 44 via mechanical fasteners such as bolts or screws (not shown), for example. In this way, the lid 37 may be removed to service the battery arrays disposed within the battery housing 28.

The body 44 includes a bottom wall or panel 48 and one or more side walls or panels 50 (FIG. 3). The bottom wall 48 supports the battery arrays disposed within the battery housing 28 and is secured to lower portions of the side walls 50. For example, the bottom wall 48 is secured to the lower portions of the side walls 50 via welding, an adhesive, or any other suitable attachment means. The side walls 50 are manufactured via stamping, for example, and extend in a vertical direction. The side walls 50 define an outer boundary of the body 44 and are secured to each other via welding or an adhesive, for example. A seal (not shown) is disposed around a periphery of the side walls 50 of the battery housing 28 and is engaged with side walls 50 and the lid 37. In this way, fluids, debris and other materials are inhibited from entering into the battery housing 28. The internal cross members (not shown) are disposed within the body 44 and extend in a transverse direction of the vehicle 10. The internal cross members may act as partitions for the battery arrays and may connect opposed side walls 50.

Each battery mounting structure 16 is secured to the vehicle frame 11 and the battery housing 28. In this way, the mounting structure 16 mounts the battery housing 28 to the vehicle frame 11. Each mounting structure 16 is made of a metal material such as aluminum, for example, and may be manufactured by a roll forming process, for example. In the example illustrated, each mounting structure 16 is secured to a respective side of the battery housing 28. In some forms, additional mounting structures may also be secured to front and rear ends of the battery housing 28, in addition to the mounting structures 16 secured to respective sides of the battery housing 28.

Figure 4:
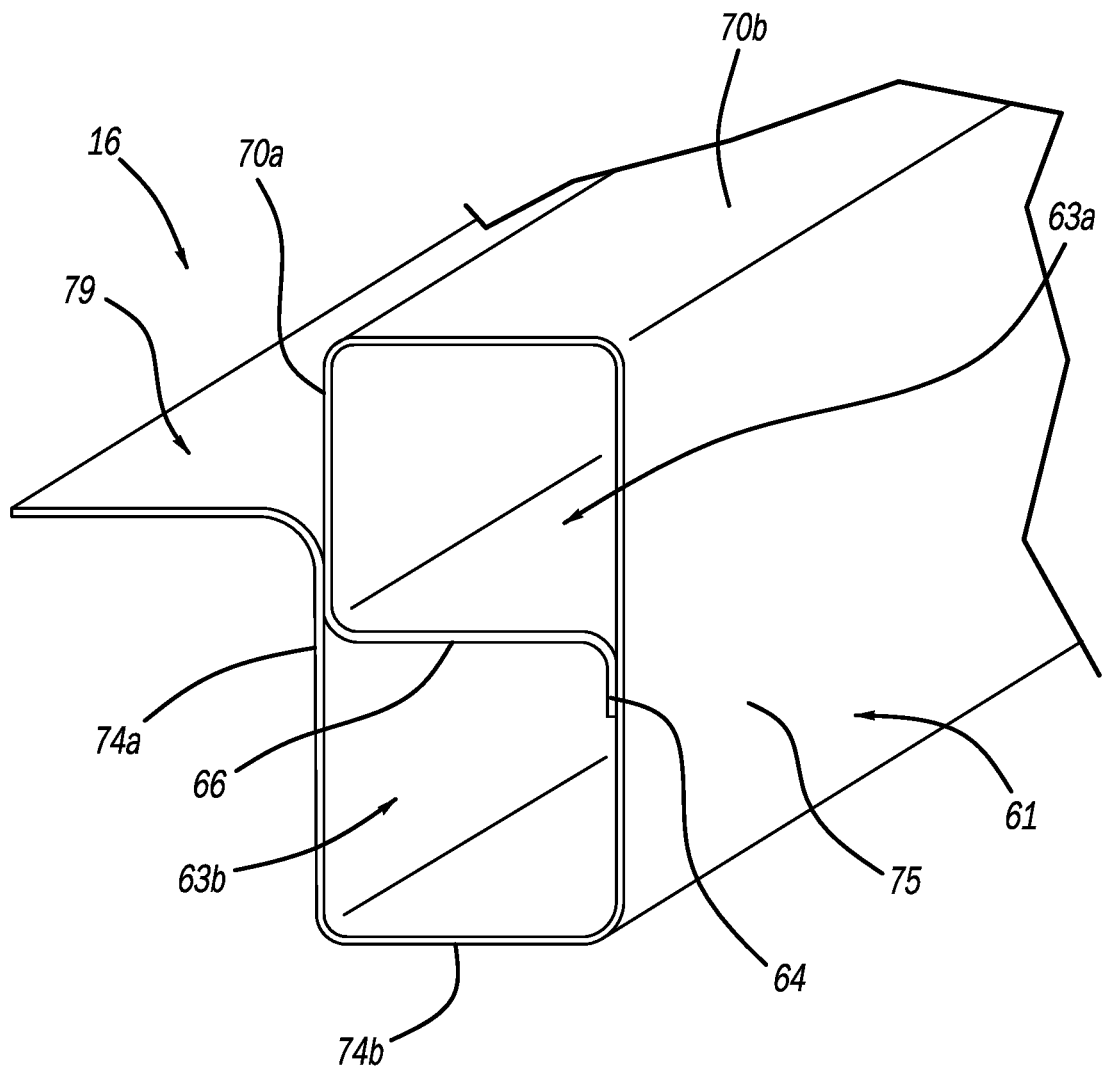
FIG. 4 is a perspective view of a portion of the battery pack mounting structure of FIG. 3.
Figure 5:
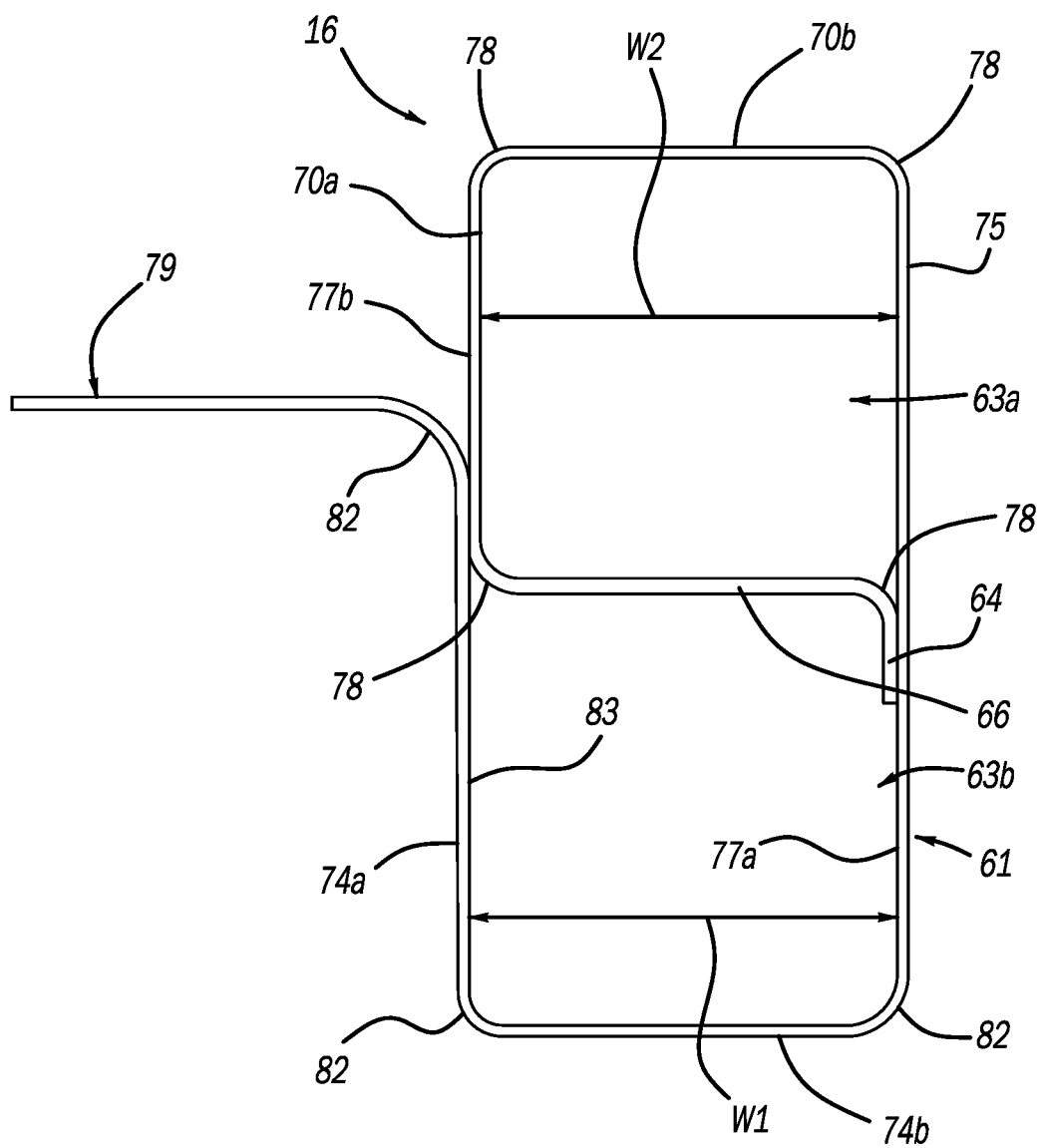
FIG. 5 is a cross-sectional view of the battery pack mounting structure of FIG. 3.
Figure 6A:
FIGS. 6A-6F are schematic views showing the steps of shaping of an original sheet into the mounting structure of FIG. 1, in accordance with the teachings of the present disclosure.
Figure 6B:
Figure 6C:
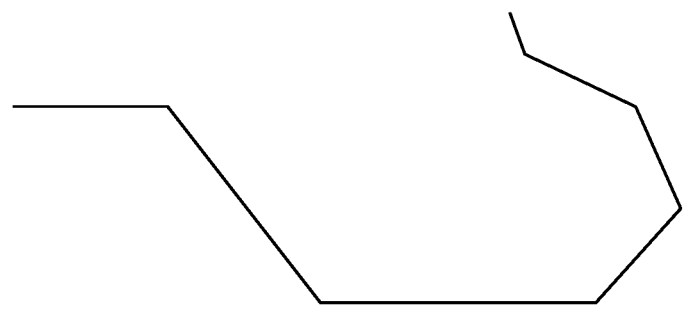
Figure 6D:
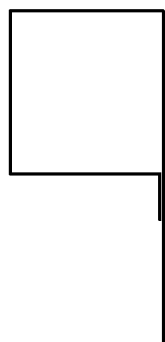
Figure 6E:
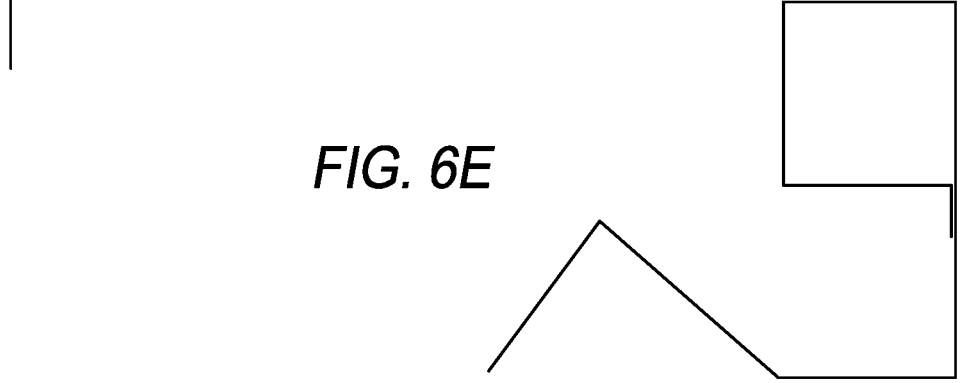
Figure 6F:
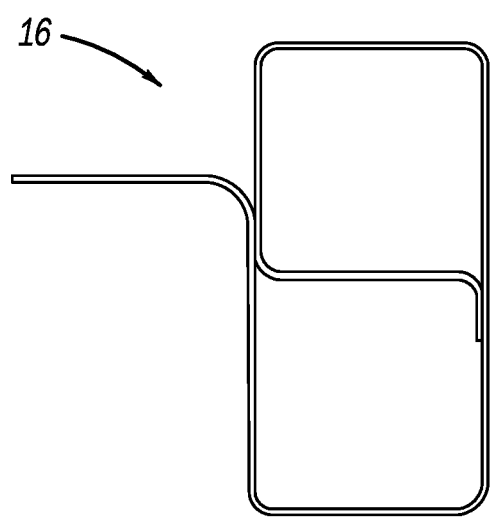

With reference to FIGS. 3-5, each mounting structure 16 includes a single, monolithic body 61 that extends in the longitudinal direction of the vehicle 10. In the example illustrated, the body 61 has a uniform thickness. The body 61 includes a central internal brace 66, a plurality of walls 70a, 70b, 74a, 74b, 75 and a flange 79. The central internal brace 66 extends in a transverse direction relative to the longitudinal direction of the vehicle 10 and is substantially parallel to the upper wall 70b and the lower wall 74b. The central internal brace 66 also acts as a partition between a closed upper section 63a of the body 61 and a closed lower section 63b of the body 61. In the example illustrated, the upper section 63a and the lower section 63b are closed sections stacked vertically on each other. In some forms, the section 63a and the section 63b are closed sections arranged in a side-by-side configuration. The upper section 63a is formed by side wall 70a, upper wall 70b and an upper section of side wall 75. Similarly, the lower section 63b is formed by side wall 74a, lower wall 74b and a lower section of side wall 75.

The body 61 can also include an end portion 64 welded to (i.e., materially bonded) an inside surface 77a of side wall 75. The end portion 64 extends from the closed upper section 63a into the closed lower section 63b and is attached to (e.g., welded to) the inside surface of the side wall 75 at or near a middle region of the side wall 75. In an alternative form, not specifically shown, the end portion 64 extends from the closed lower section 63b into the closed upper section 63a and is attached to (e.g., welded to) the inside surface of the side wall 75 at or near the middle region of the side wall 75.

The side walls 70a, 75 extend in a vertical direction and the upper wall 70b extends in a horizontal direction. In the example illustrated, the body 61 is formed such that radii 78 are included between two of the adjacent walls 70a, 70b, 75, between the central internal brace 66 and the side wall 70a, and between the central internal brace 66 and the end portion 64. Each of these radii 78 may have identical radial dimensions to each other or may have different radial dimensions.

The side wall 74a extends in a vertical direction and the lower wall 74b extends in a horizontal direction. The side wall 74a extends from the closed lower section 63b, along an exterior of the closed upper section 63a and is welded to the exterior surface 77b of the side wall 70a. In the example illustrated, the body 61 is formed such that radii 82 are included between two of the adjacent walls 74a, 74b, 75 and between the side wall 74a and the flange 79. Each of these radii 82 may have identical radial dimensions to each other or may have different radial dimensions. The side wall 74a is located further outboard relative to the side wall 70a and abuts against the side wall 70a (i.e., an inner surface 83 of the side wall 74a contacts the exterior surface 77b of the side wall 70a). In this way, the lower section 63b has a width W1 that is greater than a width W2 of the upper section 63a.

With reference to FIGS. 4 and 5, the flange 79 extends laterally away from the side wall 74a and below a respective rail 54a, 54b of the vehicle frame 11 (FIG. 3) and is configured to be secured to the respective rail 54a, 54b. That is, one or more fasteners 84 (FIG. 1) extends through the flange 79 and the respective rail 54a, 54b, thereby removably securing the battery housing 28 to the vehicle frame 11. In some forms, the flange 79 is welded to the respective rail 54a, 54b to secure the mounting structure 16 to the respective rail 54a, 54b.

The flange 79 is positioned between the upper wall 70b and the lower wall 74b and is substantially parallel to a level ground surface when the electric vehicle 10 is on the level ground surface. The flange 79 is also located above the central internal brace 66 and extends an entire length of the mounting structure 16.

Figure 7:
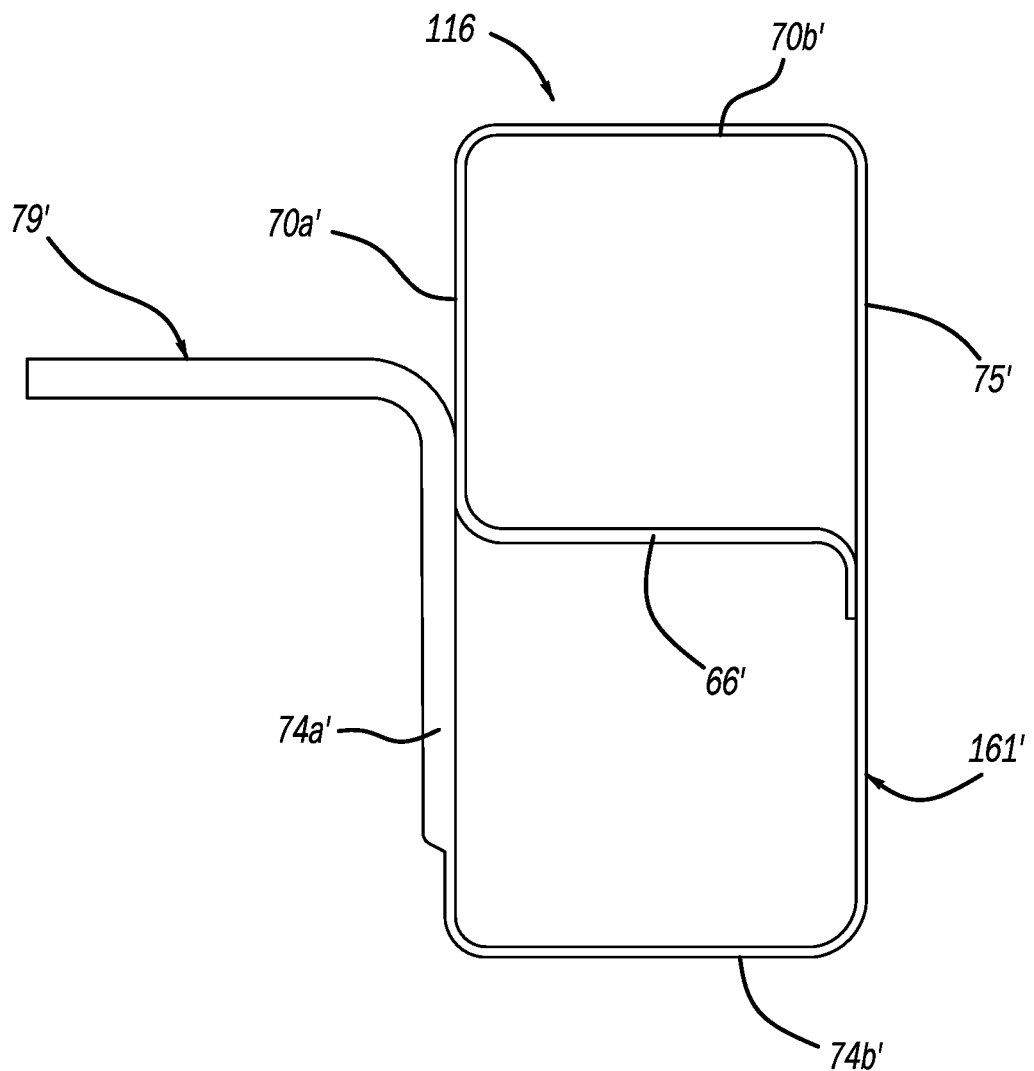
FIG. 7 is a cross-sectional view of an alternate battery pack mounting structure that can be incorporated into the vehicle of FIG. 1, in accordance with the teachings of the present disclosure.

Referring to FIG. 7, a mounting structure 116 of an alternative form is shown. The mounting structure 116 of FIG. 7 is similar to the mounting structure 116 of FIGS. 1-5, except as otherwise shown or described herein. Accordingly, similar features are denoted with similar but primed reference numerals and only differences are described in detail herein. The mounting structure 116 includes a flange 79' and at least a portion of wall 74b' that have a thickness that is greater than a thickness of walls 70a', 70b', 74b', 75' and greater than a thickness of the central internal brace 66'. In this way, the single, monolithic body 161' has a variable thickness. In the example shown in FIG. 7, the thickness of the flange 79' and the portion of the wall 74b' are equal to each other. In some forms, the thickness of the flange 79' is greater than the thickness of the portion of the wall 74b'. In some forms, the central brace 66' has a thickness that is greater than a thickness of one or more of the walls 70a', 70b', 75' and 74b'.

As shown in FIGS. 6A-6F, a process of roll forming an original sheet 13 into the mounting structure 16 as disclosed herein is illustrated.

By constructing the mounting structures 16 with the single, monolithic body 61 formed into a predetermined geometric shape disclosed herein, the strength and stiffness of the mounting structures 16 are improved. It should be understood that the mounting structures 16 having flanges 78 can be incorporated into other areas of the vehicle 10 without departing from the scope herein. For example, the single, monolithic body 61 can be incorporated into the rails 54a, 54b of the vehicle frame 11 to improve the strength and stiffness of the vehicle frame 11 and into secure other components of the vehicle to the rails 54a, 54b.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A mounting structure for a battery housing, the mounting structure comprising:
   a single, continuous body extending in a longitudinal direction, the single, continuous body comprising multiple adjacent closed sections stacked relative to each other, wherein a first end portion of the single, continuous body extends from one of the closed sections into an adjacent closed section, and a second end portion of the single, continuous body extends from one of the closed sections, along an exterior of an adjacent closed section, and laterally away from the single, continuous body to form a connecting flange.

2. The mounting structure of claim 1, wherein the single, continuous body has a variable thickness.

3. The mounting structure of claim 1, wherein the connecting flange has a thickness that is greater than a thickness of each wall forming the multiple closed sections.

4. The mounting structure of claim 1, wherein the first end portion extends into the adjacent closed section and is welded to a vertical wall of the adjacent closed section.

5. The mounting structure of claim 1, wherein the single, continuous body comprises an upper wall and a lower wall, and wherein the connecting flange is positioned between the upper wall and the lower wall.

6. The mounting structure of claim 5, wherein the single, continuous body comprises a central internal brace disposed between the upper wall and the lower wall and substantially parallel to the upper wall and the lower wall.

7. The mounting structure of claim 6, wherein the connecting flange is located above the central internal brace.

8. The mounting structure of claim 1, wherein an upper closed section of the multiple closed sections comprises a plurality of first walls defining a first cavity and a lower closed section of the multiple closed sections comprises a plurality of second walls defining a second cavity.

9. The mounting structure of claim 8, wherein the connecting flange is welded to a vertical wall of the plurality of first walls.

10. The mounting structure of claim 1, wherein the connecting flange extends an entire length of the mounting structure.

11. The mounting structure of claim 1, wherein each section of the multiple closed sections has a rectangular shaped cross-section.

12. A structural assembly for an electric vehicle, the structural assembly comprising:
- a battery housing configured to house power storage units; and
- a pair of mounting structures, each mounting structure of the pair of mounting structures secured to a respective side of the battery housing and configured to mount the battery housing to a respective rail of a pair of opposed rails,
- wherein each mounting structure comprises a single, continuous body extending in a longitudinal direction, the single, continuous body comprising multiple adjacent closed sections stacked relative to each other, wherein a first end portion of the single, continuous body extends from one of the closed sections into an adjacent closed section, and a second end portion of the single, continuous body extends from one of the closed sections, along an exterior of an adjacent closed section, and laterally away from the single, continuous body to form a connecting flange.

13. The structural assembly of claim 12, wherein the single, continuous body has a variable thickness.

14. The structural assembly of claim 12, wherein the connecting flange has a thickness that is greater than a thickness of each wall forming the multiple closed sections.

15. The structural assembly of claim 12, further comprising fasteners extending through the connecting flange and configured to extend at least partially through the respective rail.

16. The structural assembly of claim 12, wherein the single, continuous body comprises an upper wall and a lower wall, and wherein the connecting flange is positioned between the upper wall and the lower wall.

17. The structural assembly of claim 16, wherein the single, continuous body comprises a central internal brace disposed between the upper wall and the lower wall and substantially parallel to a level ground surface when the electric vehicle is on the level ground surface.

18. A mounting structure comprising:
- a single, continuous body formed by a roll forming process and comprising multiple closed sections stacked vertically, wherein a first end portion of the single, continuous body extends from one of the closed sections into an adjacent closed section, and a second end portion of the single, continuous body extends from one of the closed sections, along an exterior of an adjacent closed section, and laterally away from the single, continuous body to form a connecting flange.

19. The mounting structure of claim 18, wherein the single, continuous body has a variable thickness.

20. The mounting structure of claim 18, wherein the connecting flange has a thickness that is greater than a thickness of each wall forming the multiple closed sections.

* * * * *